United States Patent
Bassindale (10) Patent No.: US 10,202,119 B2
(45) Date of Patent: Feb. 12, 2019

(54) IDLE REDUCTION SYSTEM AND METHOD

(71) Applicant: Brian Bassindale, Ancaster (CA)

(72) Inventor: Brian Bassindale, Ancaster (CA)

(*) Notice: Subject to any disclaimer, the term of this patent is extended or adjusted under 35 U.S.C. 154(b) by 0 days.

(21) Appl. No.: 15/726,635

(22) Filed: Oct. 6, 2017

(65) Prior Publication Data

US 2018/0065637 A1 Mar. 8, 2018

Related U.S. Application Data

(63) Continuation-in-part of application No. 14/524,157, filed on Oct. 27, 2014.

(51) Int. Cl.
| | |
|---|---|
| B60W 30/18 | (2012.01) |
| B60W 10/10 | (2012.01) |
| B60W 10/06 | (2006.01) |
| B60W 50/14 | (2012.01) |
| B60R 25/20 | (2013.01) |
| F02N 11/08 | (2006.01) |
| F02D 29/02 | (2006.01) |

(52) U.S. Cl.
CPC ... *B60W 30/18054* (2013.01); *B60R 25/2063* (2013.01); *B60W 10/06* (2013.01); *B60W 10/10* (2013.01); *B60W 50/14* (2013.01); *F02D 29/02* (2013.01); *F02N 11/0803* (2013.01); *B60W 2050/146* (2013.01); *B60W 2520/04* (2013.01); *B60W 2540/06* (2013.01); *B60W 2710/06* (2013.01); *B60W 2710/10* (2013.01); *F02D 2700/07* (2013.01); *F02N 2200/0801* (2013.01); *F02N 2200/0802* (2013.01); *F02N 2200/0804* (2013.01); *F02N 2200/0814* (2013.01)

(58) Field of Classification Search
CPC ......... F02N 11/0803; F02N 2200/0801; F02N 2200/0802; F02N 2200/0804; F02N 2200/0814; B60R 25/2063; B60W 30/18054; B60W 10/10; B60W 10/06; B60W 50/14; B60W 2710/10; B60W 2050/146; B60W 2540/06; F02D 29/02; F02D 2700/07
See application file for complete search history.

(56) References Cited

U.S. PATENT DOCUMENTS

| | | | |
|---|---|---|---|
| 2003/0183191 A1* | 10/2003 | Bertness | F02D 41/042 123/198 R |
| 2008/0223645 A1* | 9/2008 | Shaw | B60R 25/045 180/270 |

(Continued)

*Primary Examiner* — Sizo B Vilakazi
(74) *Attorney, Agent, or Firm* — Ridout & Maybee LLP (57) ABSTRACT

The present concept is method of controlling a vehicle's engine idle and includes the steps of monitoring a vehicles operating parameters with a controller and comparing parameters to preselected shutdown conditions. In the event shutdown conditions are met and the key is not in the ignition, the controller warns operator of impending shutdown. The controller intercepts the ignition key signal and simulates the vehicle key to be in the run position such that vehicle functions are operable as if key is in run position. The controller shuts down engine. The method may also include the steps of: the controller intercepting the ignition key signal and simulating the vehicle key to be in the accessory position such that vehicle functions are operable as if key is in accessory position.

20 Claims, 8 Drawing Sheets

(56) References Cited

U.S. PATENT DOCUMENTS

| | | | | |
|---|---|---|---|---|
| 2008/0262707 | A1* | 10/2008 | Yamaguchi | B60W 20/40 701/112 |
| 2009/0216430 | A1* | 8/2009 | Lecole | F02N 11/0825 701/112 |
| 2009/0319161 | A1* | 12/2009 | Abendroth | F02N 11/0818 701/112 |
| 2010/0057332 | A1* | 3/2010 | Katoh | F02N 11/0803 701/113 |
| 2010/0312426 | A1* | 12/2010 | Philipp | B60K 28/04 701/22 |
| 2011/0202264 | A1* | 8/2011 | Sengebusch | F02N 11/0851 701/113 |
| 2012/0143467 | A1* | 6/2012 | Yu | F02N 11/0818 701/102 |

* cited by examiner

Figure 1: Shut Down Conditions

Figure 2: Heating and Cooling Example

Figure 3: Battery Monitoring Example

Figure 4: Hood Position Example

Figure 5: Fan Function

Figure 6: Seatbelt Example

IDLE REDUCTION SYSTEM AND METHOD

This application is a continuation in part of U.S. application Ser. No. 14/524,157 titled IDLE REDUCTION SYSTEM AND METHOD filed Oct. 24, 2014 by Brian Bassindale, which is a continuation in part of U.S. patent application Ser. No. 13/533,215 filed Jun. 26, 2012 by Brian Bassindale which claims priority from previously filed U.S. Provisional Patent Application No. 61/504,272, titled IDLE REDUCTION SYSTEM AND METHOD filed Jul. 4, 2011 by Brian Bassindale.

FIELD OF THE INVENTION

The present concept relates to idle management systems for automobiles, trucks and other commercial vehicles and more particularly relates to an idle reduction system and method of operation for motor vehicles including automobiles, trucks and other commercial vehicles.

BACKGROUND OF THE INVENTION

Idling of motor vehicles contributes to the emission of greenhouse gases. In particular commercial and municipal vehicles are often left to idle for long periods of time due to the job responsibilities of the operator. In many instances the engine is left to idle in order to control temperature, communications and lighting equipment within the commercial and/or municipal vehicle.

For every liter of gas that is consumed approximately 2.54 kilograms of greenhouse gases is emitted into the atmosphere, Therefore there is a need for a system which will reduce the total idling time of vehicles and manage the idle time of vehicles.

SUMMARY OF THE INVENTION

The present invention is a method of controlling a vehicle's engine idle while the vehicle is at rest, comprising the steps of:
a) placing the vehicle transmission to a position selected from among park or neutral;
b) shut down engine by turning key to the off position and removing the key from the ignition;
c) driver exits the vehicle;
d) an on board controller configured for monitoring a vehicles operating parameters from the vehicles electronic control module (ECM) through the CAN BUS communications port the onboard controller is configured to compare preselected operating parameters to preselected startup conditions;
e) providing at least one dual channel module which has a master portion in direct electrical communication with a vehicle control and a slave portion in direct communication with the ECM wherein in a normal operating mode the slave portion recreates the normal vehicle control signal received by the master portion and communicates this directly to the ECM, the at least one dual channel module is for the vehicle key switch;
f) wherein the dual channel module also in communication with the on board controller for receiving instructions to modify the signals sent by the slave portion directly to the ECM, and if required by the master portion to receive and return signals directly to the vehicle control in the event preselected operating condition parameters are met to startup or shut down;
g) in the event preselected startup conditions are met the onboard controller is adapted to communicate with the dual channel module which intercepts key position signals from the vehicle key switch and the slave portion sends the key run position signal directly to the ECM directly thereby enabling vehicle functions operable as if the key is in run position and the master portion will receive and return signals directly to the vehicle control as required to ensure shut down can occur even if the physical key position remains unchanged;
h) the dual channel module is configured to automatically start up the engine and the engine idles with the vehicle at rest.

Preferably there includes further steps of:
i) the onboard controller monitoring a vehicles operating parameters through the CAN BUS communications port with and comparing preselected operating parameters to preselected shutdown conditions;
j) in the event shutdown conditions are met the onboard controller is configured to communicate with the dual channel module wherein the slave portion will send signals directly to the ECM to shut down the engine and the master portion will receive and return signals to the vehicle control as required to ensure shut down can occur even if the physical key position remains unchanged;
k) return to step d), thereby continuously and automatically starting and stopping the engine depending upon the condition of the preselected operating parameters.

Preferably there is a further step a') after a) as follows:
a') providing a controller interface communicating with the onboard controller and displaying in real time the status of the vehicle to the operator on a display screen.

The present invention is also a method of controlling a vehicle's engine idle while the vehicle is at rest, comprising the steps of:
a) placing the vehicle transmission to a position selected from among park or neutral;
b) shut down engine by turning key to the off position and removing the key from the ignition and placing the vehicle into an anti-theft mode such that if the vehicle transmission is disengaged from park or neutral the engine will shut down and not restart until the anti-theft mode has been deactivated with a function on the controller interface; driver exits the vehicle;
c) monitoring a vehicles operating parameters with an onboard controller which is configured to compare preselected operating parameters to preselected startup conditions, wherein the onboard controller monitors the driver's seatbelt engagement status which is one of the preselected operating parameters;
d) in the event preselected startup conditions are met the onboard controller intercepts key position signals from the ignition and sends the key run position signal to the on board computer thereby enabling vehicle functions operable as if the key is in run position;
e) the onboard controller automatically starts up the engine and the engine idles with the vehicle at rest.

Preferably step f) is replaced with f') as follows:
f) the onboard controller warns the operator of an impending startup and the onboard controller automatically starts up the engine and the engine idles with the vehicle at rest, thereby continuously and automatically starting and stopping the engine depending upon the condition of the preselected operating parameters.

Preferably the vehicle's operating parameters are received from the vehicle CAN BUS interface which receives data from existing sensors within the vehicle. The onboard controller is a programmable logic controller communicating with the CAN BUS interface. The programmable logic controller intercepts signals from the on board computer regarding the ignition key status and communicates signals to the vehicles on board computer selectively activating preselected key positions thereby enabling preselected vehicle functions as if the vehicle was in that key position.

Preferably the method includes the step g) as follows;
g) in the event shutdown conditions are met the onboard controller automatically shuts down engine and the onboard controller intercepts key position signals from the ignition and sends a key accessory position signal to the on board computer thereby enabling vehicle functions operable as if the key is in the accessory position;

Preferably there further includes the step of providing a controller interface communicating with the onboard controller and displaying in real time the status of the vehicle to the operator. The controller interface is a high resolution screen communicating with the onboard controller. The controller interface displays to the operator whether or not the vehicle engine is on. The onboard controller monitors vehicle transmission position, vehicle key position, vehicle battery voltage, vehicle hood position.

The present invention is a method of controlling a vehicle's engine idle while the vehicle is at rest, comprising the steps of:
a) the vehicle gear shift is placed in a position selected from among park or neutral and the key is left in the ignition in the run position;
b) monitoring a vehicles operating parameters with a onboard controller and comparing preselected operating parameters to preselected shutdown conditions wherein the onboard controller monitors the driver's seatbelt engagement status which is one of the preselected operating parameters;
c) if shutdown conditions are met the onboard controller intercepts key position signals from the ignition and sends the key off position signal to the vehicles on board computer thereby shutting down the engine;
d) monitoring a vehicles operating parameters with an onboard controller and comparing preselected operating parameters to preselected startup conditions;
e) in the event preselected startup conditions are met the onboard controller intercepts key position signals from the ignition and send engine startup signal to the on board computer thereby starting up the engine and enabling vehicle functions with the engine idling and the vehicle at rest;
f) return to step b;

There further may include the step b') after b) as follows:
b') providing a controller interface communicating with the onboard controller and displaying in real time the status of the vehicle to the operator on a display screen.

There further includes the step g) as follows:
g) if shutdown conditions are met, onboard controller initiates a preselected countdown time to engine shutdown and displays the countdown on the display screen, once the countdown is complete the onboard controller intercepts key position signals from the ignition and sends the key off position signal to the vehicles on board computer thereby shutting down the engine;

Or more preferably includes the step g) and h) as follows:
g) if shutdown conditions are met, onboard controller initiates a preselected countdown time to engine shutdown and displays the countdown on the display screen, operator may cancel the shutdown with a controller interface function;
h) once the countdown is complete the onboard controller intercepts key position signals from the ignition and sends the key off position signal to the vehicles on board computer thereby shutting down the engine;

BRIEF DESCRIPTION OF THE DRAWINGS

The concept will now be described by way of example only with reference to the following drawings in which.

DETAILED DESCRIPTION OF THE PREFERRED EMBODIMENTS

Definitions

As used in this specification the following terms refer to but are not limited to the following meanings:

"Vehicles operating parameters"—include but are not limited to vehicle speed, tachometer reading (rpm), vehicle gear (transmission position), cabin temperature, coolant temperature, air intake temperature, battery temperature and hood position "Controller"—An aftermarket installed signal processor which preferably is a Programmable Logic Controller as described below which modifies routing of signals throughout the vehicle particularly receiving and intercepting the ignition key signal.

Dual channel module—hardware containing a master portion and a slave portion so that the hardware can both receive commands from an external master device and provide commands to an external slave device.

Vehicle electronic control module (ECM)—the vehicle computer that controls the electrical subsystems, including the engine, in the vehicle.

Vehicle control—any local function controllers including for example the ignition switch, door lock actuator, air conditioner and heat actuator, engine controller, seat belt monitor.

"Preselected shutdown conditions"—include but are not limited to a preselected vehicle speed, preselected engine's rotations per minute and preselected vehicle's transmission gear position.

"Ignition switch"—refers to the electronic switch which sends an ignition signal normally to the vehicle onboard computer "Intercepts the ignition key signal": in this concept the controller intercepts the ignition key signal rather than sending it to the vehicle onboard computer The "ignition switch" generally has four positions: off position, accessories position, run position and start position The "Run position" turns on all car's systems i.e. windshield wipers, window motors, etc.

The "Accessory position" normally allows certain car accessories such as the radio to be functional, however accessories that use too much battery power such as window motors remain off to prevent battery from being drained "CAN BUS" interface refers to a "Controller-area network" which is a vehicle bus standard designed to allow microcontrollers and other devices to communicate with each other within a vehicle without a host computer.

Programmable logic controller (PLC): A device using programmed, custom instructions to provide automated monitoring and control functions by evaluating a set of inputs. Used to automate complex functions in a variety of applications.

DESCRIPTION

The present concept an idle reduction system and method is designed to manage and reduce idling of motor vehicles and therefore the pollution and ultimately the amount of greenhouse gases that are emitted by a vehicle.

The idle reduction system and method consists of a high-resolution operator screen and a programmable logic controller (PLC) that is linked through the CAN BUS communications port that is present in almost every vehicle. The term CAN BUS stands for controller area network, which is a vehicle bus standard, designed to allow microcontrollers and devices to communicate with each other within a vehicle without a host computer.

The idle reduction system and method monitor's communications on the CAN BUS network to recognize and monitor a number of engine functions including but not limited to engine rpm, gear selector position, vehicle speed, coolant temperature, battery voltage, and other parameters.

The operator screen will provide information to the operator such as when the vehicle will start and when the vehicle will stop as well as a condition that will invoke the vehicle engine to start for example such as low voltage or the need for heating and cooling.

The operator screen will also provide means for the operator to set the desired temperature set point so that they will be kept comfortable while the engine remains off. The PLC will also record historical data and will save information that can later be viewed such as the number of hours that the idle reduction system and method was managing the engine and the reasons why it may have started the engine to provide feedback to the operator to maximize payback and minimize idling time.

The system is non-intrusive to the vehicle wiring by making only one connection to the OEM harness, which is present in almost every vehicle.

The idle reduction system and method will function in almost any type of mobile vehicle or equipment, which operates using a 12 or 24-volt electrical system.

Figure 1:
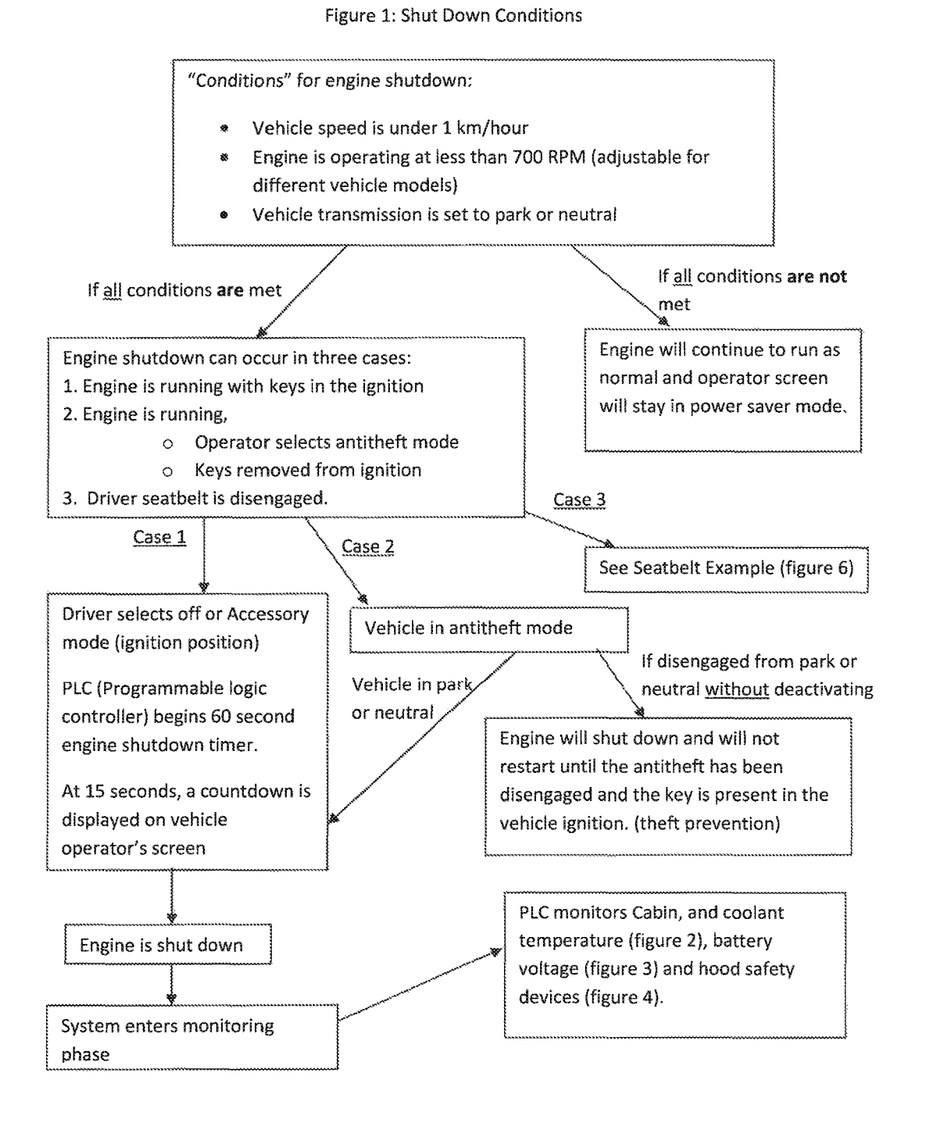
FIG. 1 is a flow chart entitled Shut Down Conditions showing a decision tree for engine shut down.

Referring now to FIG. 1 the idle reduction system and method controls shutdown of the engine as follows:

A PLC which is communicating through the CAN BUS network of the vehicle monitors transmission mode selection, engine rpm and the vehicle speed as shown as 102 in FIG. 1. When all three of these conditions are detected and acceptable the engine shutdown sequence can begin.

In the example given in FIG. 1 the vehicle speed must be under 1 kilometer per hour, the engine rpm must be less than 700, and the vehicles transmission must be set in park or neutral.

If all of these conditions are not met the engine will continue to run as shown as 106 in FIG. 1 and the PLC will remain in a power saver mode.

In the event that all of these conditions are met as shown as the programmable logic controller (PLC) begins to count in seconds wherein the default of 60 seconds being the time after which the engine will shut down. This count time is adjustable by the supervisor area. The operator screen will depict the last 15 seconds prior to engine shutdown in order to alert the operator that in 15 seconds time the engine will be shut down unless the operator intervenes. Therefore during the 60-second countdown period in the event that the three conditions met in 102 remain unchanged the engine will shutdown.

There are three distinct cases in which the engine is shut down, shown as 104 in FIG. 1.

In the first case the key is left in the ignition in either the accessory mode in which case windows, windshield wipers etc., would continue to operate to keep the windows clear and also other interior functions will continue to operate.

The keys may also be left in the off position to save power and not provide any of the above functionality.

The third case refers to an alternate embodiment where engine shutdown is tied to the engagement status of the driver's seatbelt, this is shown as 120 in FIG. 1.

The second case would be where the keys are removed from the ignition and the vehicle is placed in an anti-theft mode, which can be selected on the operator screen. This is shown as 110 in FIG. 1.

The operator selects the anti-theft mode 110 and removes the keys, when he or she leases the vehicle. The operator will typically secure the vehicle by locking all the doors and leave the vehicle in the running condition. The anti-theft device simulates the key being in the vehicle by using a module typically used by the OEM for a factory installed remote start. The PLC is able to teach the module the code that the vehicle computer requires by using the teach key portion in the installation portion of the screen. When anti-theft is selected a signal is sent to the vehicle computer through the CAN BUS wherein the vehicle thinks that the key is still installed. If at any time the transmission is moved from park the engine will shut down and will not restart until the anti-theft has been disengaged and the key is present in the vehicle ignition, which is shown as 116 in FIG. 1.

In the case where the engine is running with the keys in the ignition in this case the operator likely still is within the vehicle as shown as 108 in FIG. 1. Once the PLC completes its 60-second countdown, which includes a 15 second visual display countdown on the operator screen the engine is shut down 112 and the system enters a monitoring phase 114.

In the monitoring phase the PLC will monitor as shown as 118 in FIG. 1:

A) Cabin temperature, which is derived from a remotely installed sensor with the system.

B) Low voltage on the starting battery bank (Battery 1).

C) Low voltage on the auxiliary battery bank (Battery 2)

D) Coolant temperature from the vehicle CAN BUS.

E) Hood sensor safety, which is a magnetic sensor monitoring hood position for safety of technicians that may be servicing the vehicle.

Management of Heating and Cooling

Figure 2:
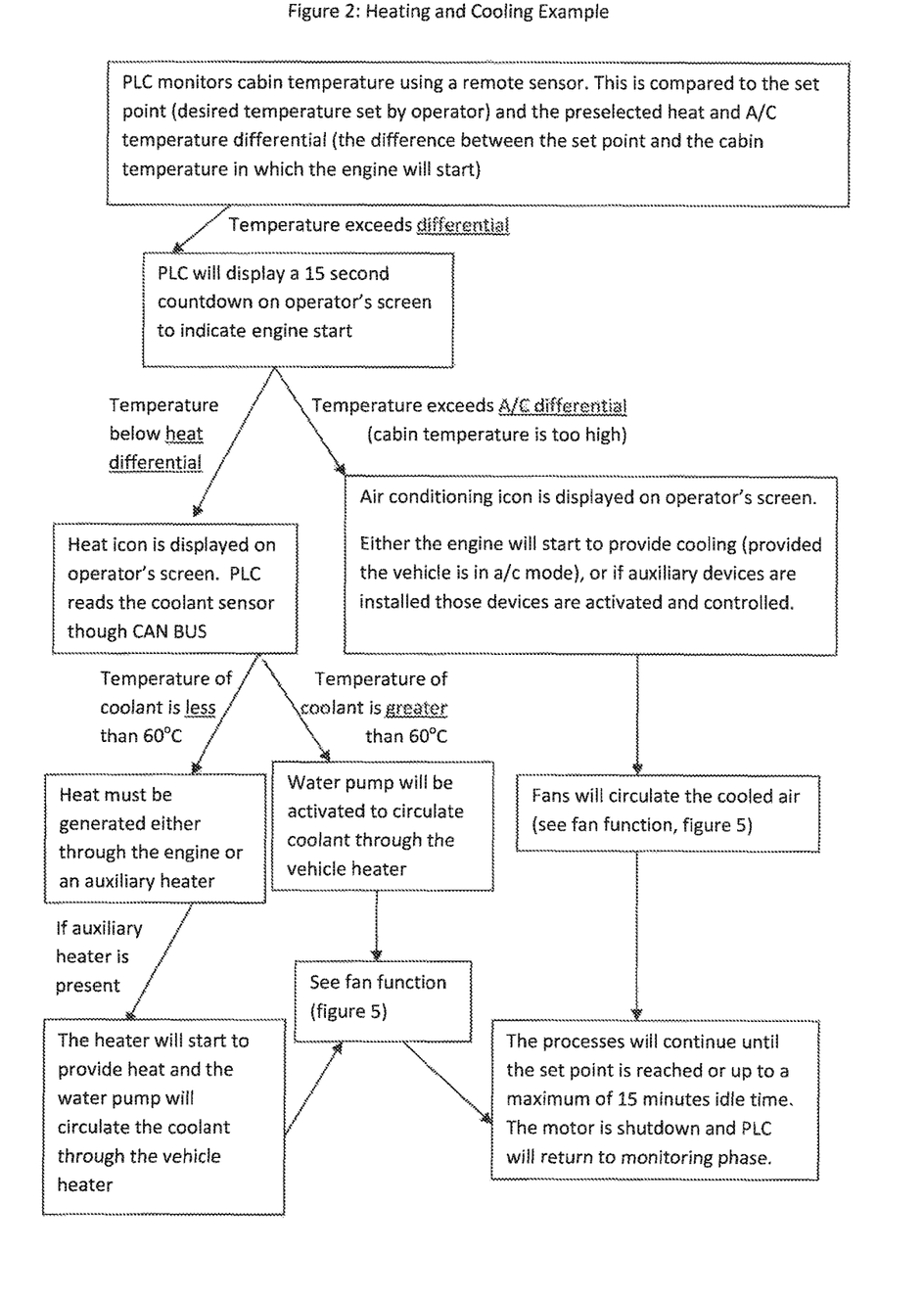
FIG. 2 is a flow chart entitled Heating and Cooling Example showing a decision tree for idle management to maintain heating and cooling functions within the vehicle.

FIG. 2 is a flow chart showing an example of the idle reduction system and method managing heating and cooling in a vehicle.

Devices can be added to the vehicle in order to control the temperature such as: Fuel fired heaters which may heat the engine coolant and/or air type heaters, DC air conditioning systems to provide cooling and/or auxiliary power units to provide both heating and cooling.

An example of operations sequence is shown in FIG. 2.

The PLC is in the monitoring phase and monitors the cabin temperature using a remote sensor. This temperature is compared to a set point and a preselected heating and air conditioning temperature differential. For example the set point may be 20 degrees centigrade and the high temperature differential may be set at 10 degrees centigrade, a low temperature differential may be set at 3 degrees centigrade.

In this example the vehicles engine is used to cool the cabin compartment and in this example an auxiliary fuel fired heater is used to heat the engines coolant.

With the system in the monitoring phase shown as 202 the PLC detects an excessive temperature differential and will display a 15 second countdown on the operator screen to indicate that the engine will start shown as 204.

In the case of requirement for heating the temperature will be below the low temperature differential in this case 3 degrees below the set point of 20 and the heat icon is displayed on the operators screen and the PLC will read the coolant temperature of the sensor through the CAN BUS of the vehicle shown as 206.

In this example if the coolant temperature is less than 60 degrees centigrade heat must be generated either through the engine or through an auxiliary heater shown as 210.

In this case an auxiliary heater is present to heat the coolant of the engine and the heater will start to provide heat and the water pump will circulate the coolant through the vehicle heater shown in 214.

In the case where the temperature of the coolant is already greater than 60 degrees C. the water pump will be activated to circulate coolant through the vehicle heater and there will be no requirement for the auxiliary heater to be activated as shown as 212 in FIG. 2.

Figure 5:
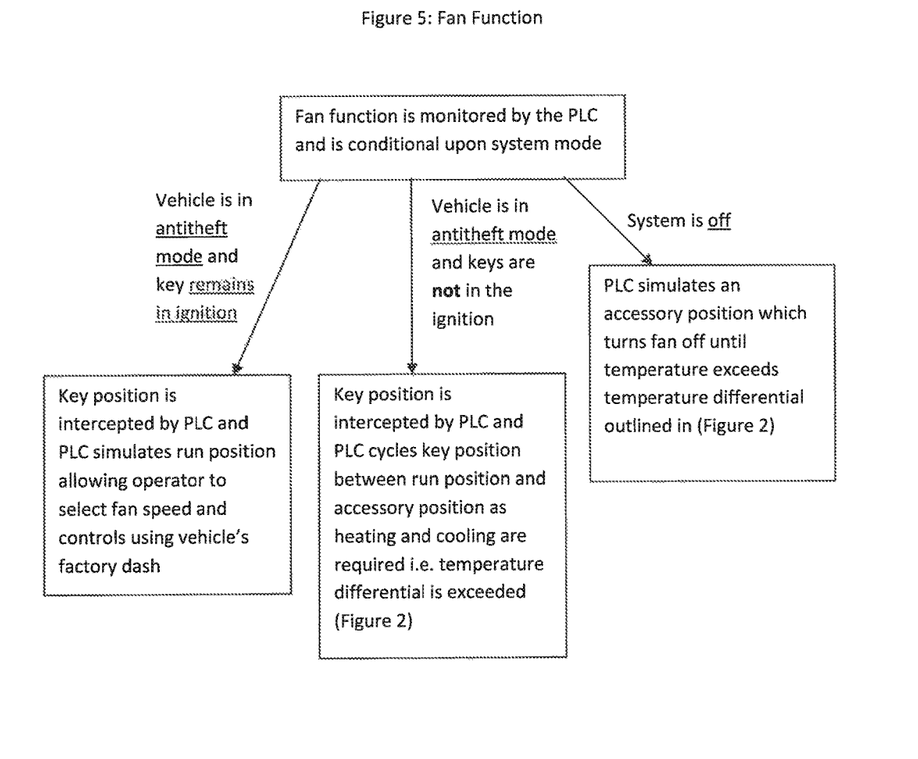
FIG. 5 is a flow chart entitled Fan Function showing the decision tree in regard to operation of the fan.

The fan function is activated as shown in 216 and explained more fully in FIG. 5 depending upon which mode the system is in. The process will continue until the set point is reached and the motor is shut down and the PLC will return to the monitoring phase 202.

In the case of air conditioning requirements in which case the cabin temperature is too high an air conditioning icon is displayed on the operators screen and either the engine will start to provide cooling if auxiliary devices are installed those devices are activated and controlled shown as 208 in FIG. 2.

Fans will circulate the cool air 218 which is more fully described and explained in FIG. 5 describing the fan function.

The engine will continue to run until the set point is reached or up to a maximum of 15 minutes of idle time. Thereafter the motor is shut down and the PLC will continue in the monitoring phase.

Battery Monitoring Example

Figure 3:
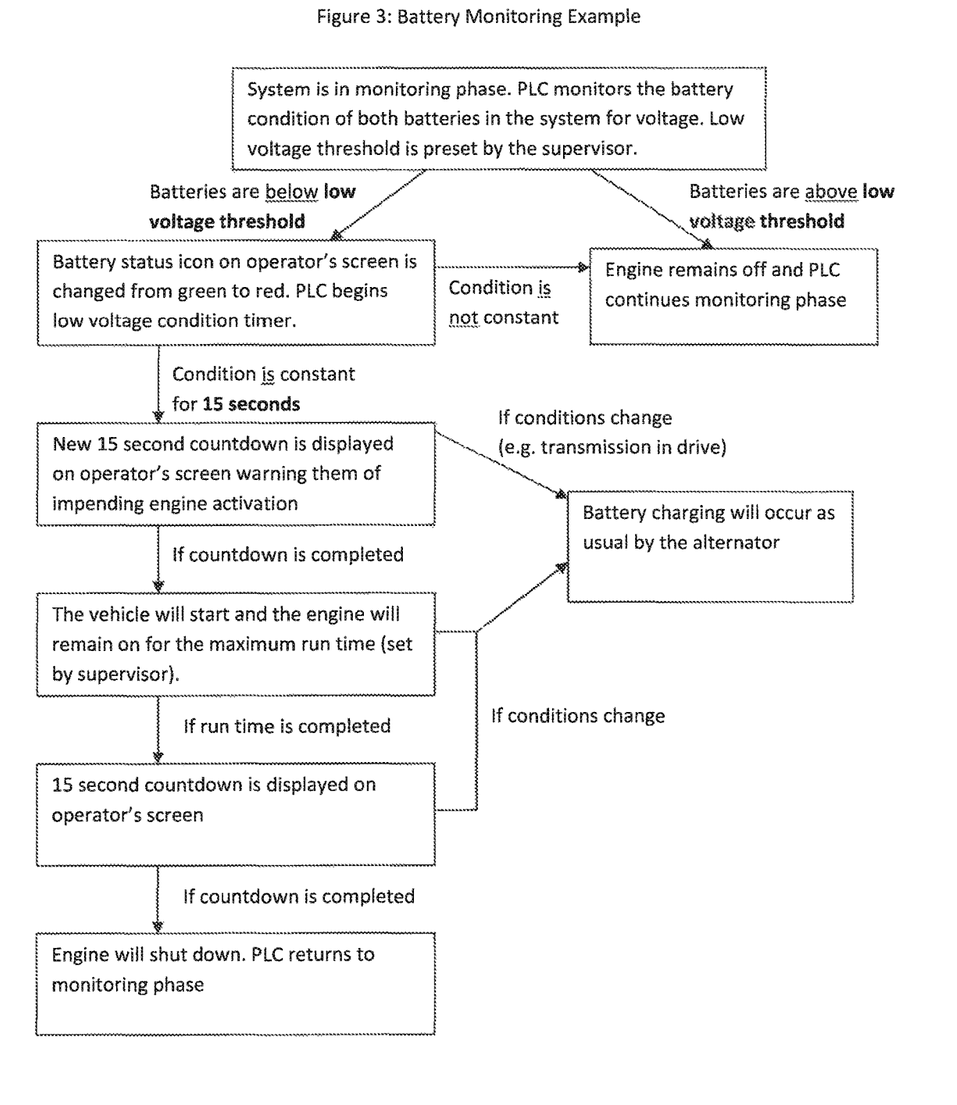
FIG. 3 is a flow chart entitled Battery Monitoring Example showing a decision tree for maintaining battery condition.

Figure three shows an example of how the PLC can monitor the battery condition.

This example assumes that there are two batteries present. The original equipment battery denoted as battery 1 is the one used for starting the engine whereas battery 2 is used to run all the accessories in the vehicle including the computers. In this manner the threshold of the low voltage set point is normally higher for battery bank 1 for example 11.9 volts and the threshold for battery 2 is normally lower somewhere around 11.3 volts. The PLC monitors the battery condition of both batteries in the system for low voltage. The voltage threshold is preset by the supervisor and is shown as 302 in FIG. 3.

If the batteries are below the low voltage threshold then the battery status icon appears on the operators screen the PLC begins a low voltage condition timer. This is shown as 304 in FIG. 3.

Provided the condition is constant for at least 15 seconds, a new 15-second countdown is displayed on the operator screen warning them of an impending engine activation shown as 306 in FIG. 3.

Once the countdown is completed the vehicle engine will start and remain on for a maximum run time, which is normally set at 15 minutes shown as 308 in FIG. 3.

Once the run time is completed a 15 second countdown is again displayed on the operator screen as 310 and once the countdown is completed the engine will shut down shown as 312 and the PLC will return to the monitoring phase 302.

In this example battery charging will occur as usual by the normal alternator or generator, which is present in the engine shown as 316 in FIG. 3.

In the case where the batteries are above the low voltage thresholds the engine will remain off and the PLC will continue in the monitoring phase shown as 314.

Hood Position Example

Magnetic hood sensors are installed to ensure safety for technicians opening the hood for servicing the engine. If the engine is on and the hood is opened the engine will continue to run for inspection with automatic start/shut down disabled. If the hood is opened while the engine is off the engine will not automatically start. An LED is located in the sensor and will come on indicating to the technician that the engine is not going to automatically start.

Figure 4:
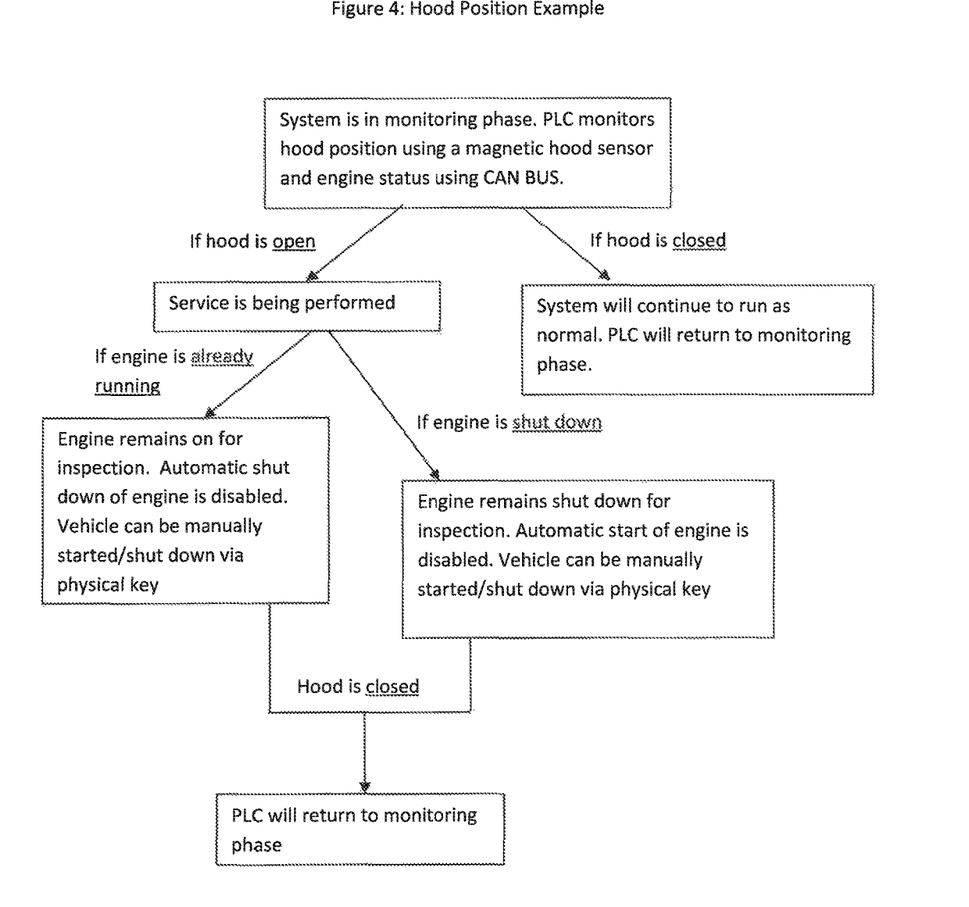
FIG. 4 is a flow chart titled Hood Position Example showing a decision tree for opening the hood of a vehicle for maintenance.

Referring to FIG. 4 with the system in the monitoring phase shown as 402 should the hood of a car be open shown as 404 and the engine is already running shown as 406 the engine will remain running for inspection with automatic shut down of engine disabled until the hood is closed shown as 412 and the system will return back to the monitoring phase shown as 410. On the other hand if the hood is open when the engine is turned off shown as 408 the automatic engine start will be disabled. In both cases when the hood is opened the vehicle can be manually started/shut down using the vehicles physical key.

Once the hood is closed the PLC will return to the monitoring phases shown as 410 and 402.

Fan Function

The fan in the vehicle will be controlled in three different ways. If the vehicle key remains in the ignition and anti-theft mode is selected the PLC intercepts and controls the key position such that the operator will have full control of the blower speed controls.

If the vehicle key remains in the ignition and anti-theft mode is selected the PLC determines whether temperature adjustment is required. The PLC simulates the key position to be in the Run position.

If the vehicle is left in the off position the PLC can be controlled such that the fan will come on to a predetermined position.

In the case that the vehicle is left in the anti-theft mode with keys remaining in the ignition shown as 504 the system is assuming that the operator is present in the vehicle and full control of all periphery features available when car is running (i.e. the blower, windshield wipers, etc) is retained by the operator.

In the case that the vehicle is left in the anti-theft mode with keys removed the ignition shown as 506 is assuming that the operator is not present in the vehicle and the blower is controlled by the PLC with fan intensity determined by factory dash setting.

FIG. 5 shows the fan function operations cycling the key position. With the PLC in the monitoring phase it will go to there are three different possibilities.

Firstly if the vehicle key remains in the ignition and antitheft mode is selected by the operator shown as 504 the PLC simulates the run position allowing the operator to select fan speed and controls using the vehicle's factory dash. If the vehicle key is removed from the ignition and anti-theft mode is selected shown as 506 the PLC simulates the accessory position which turns fan off until temperature exceeds temperature differential outlined in FIG. 2 blower intensity remains unchanged from operator's previous selection.

Lastly if the system is off meaning the key is in the off position the PLC simulates the accessory position which turns fan off until temperature exceeds temperature differential outlined in FIG. 2, blower intensity remains unchanged shown as 508 in FIG. 5.

It should be apparent to persons skilled in the arts that various modifications and adaptation of this structure described above are possible without departure from the spirit of the invention the scope of which defined in the appended claim.

Alternate Embodiment

The alternate embodiment third case for shutdown shown as 120 in FIG. 1 would occur where no explicit mode is selected i.e. accessory mode is not indicated via ignition and anti-theft mode is not selected on the operator screen. This is shown as 602 in FIG. 6.

The PLC monitors the engagement status of the driver seatbelt.

Figure 6:
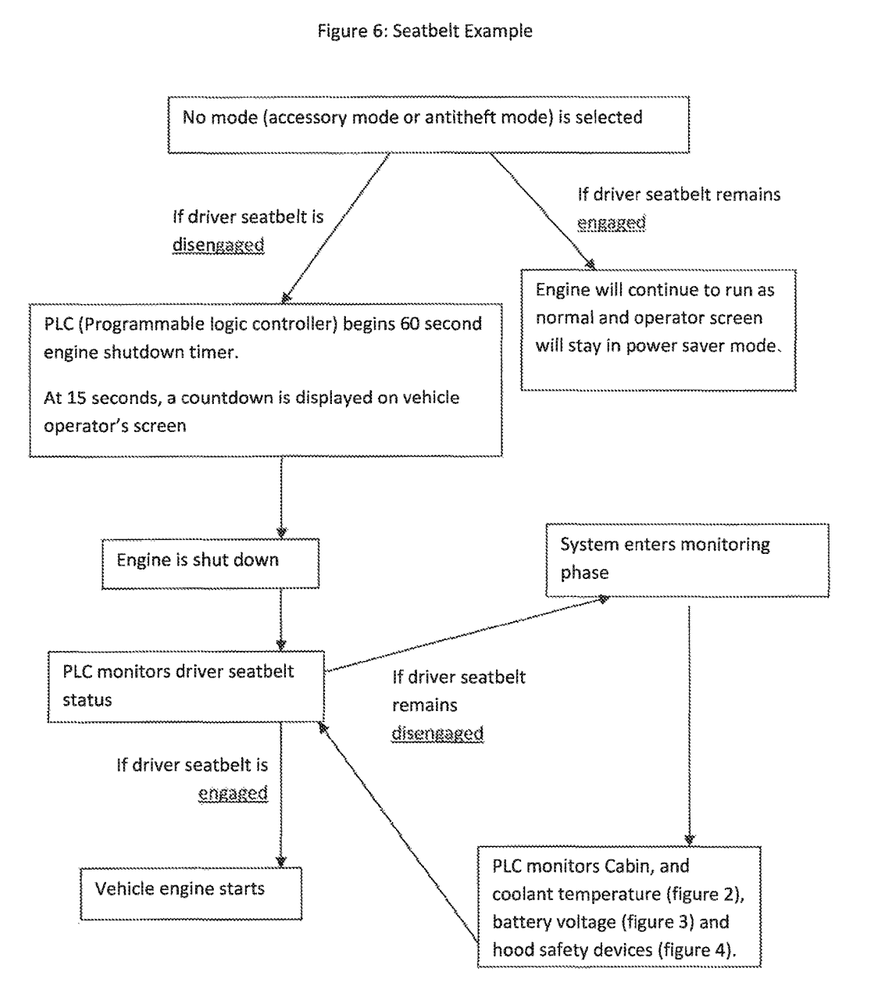
FIG. 6 is a flow chart entitled Seatbelt Example showing the decision tree for engine shutdown based on driver seatbelt status.

If the operator having not indicated a mode 602, but having satisfied the conditions for shutdown shown as 102 in FIG. 1, does not disengage the driver seatbelt the engine will continue to run as shown as 606 in FIG. 6 and the PLC will remain in a power saver mode.

The operator having not indicated a mode 602, but having satisfied the conditions for shutdown shown as 102 in FIG. 1, disengages the driver seatbelt.

An operator typically disengages the seatbelt to exit the vehicle but in case the operator is still is within the vehicle a shutdown timer is instantiated shown as 604 in FIG. 6. Once the PLC completes its 60-second countdown, which includes a 15 second visual display countdown on the operator screen the engine is shut down 608 and the system enters a monitors the engagement status of the driver seatbelt 610.

In the case where the driver seatbelt remains disengaged the system enters monitoring phase 612.

In the monitoring phase the PLC will monitor as shown as 614 in FIG. 6:
  A. Cabin temperature, which is derived from a remotely installed sensor with the system.
  B. Low voltage on the starting battery bank (Battery 1).
  C. Low voltage on the auxiliary battery bank (Battery 2).
  D. Coolant temperature from the vehicle CAN BUS.
  E. Hood sensor safety, which is a magnetic sensor monitoring hood position for safety of technicians that may be servicing the vehicle.

Further, the monitoring phase 614 will also monitor the engagement status of the driver seatbelt via the PLC 610.

In the case where the driver seatbelt is eventual re-engaged the vehicle engine will restart 616.

Alternate Embodiment

Figure 8:
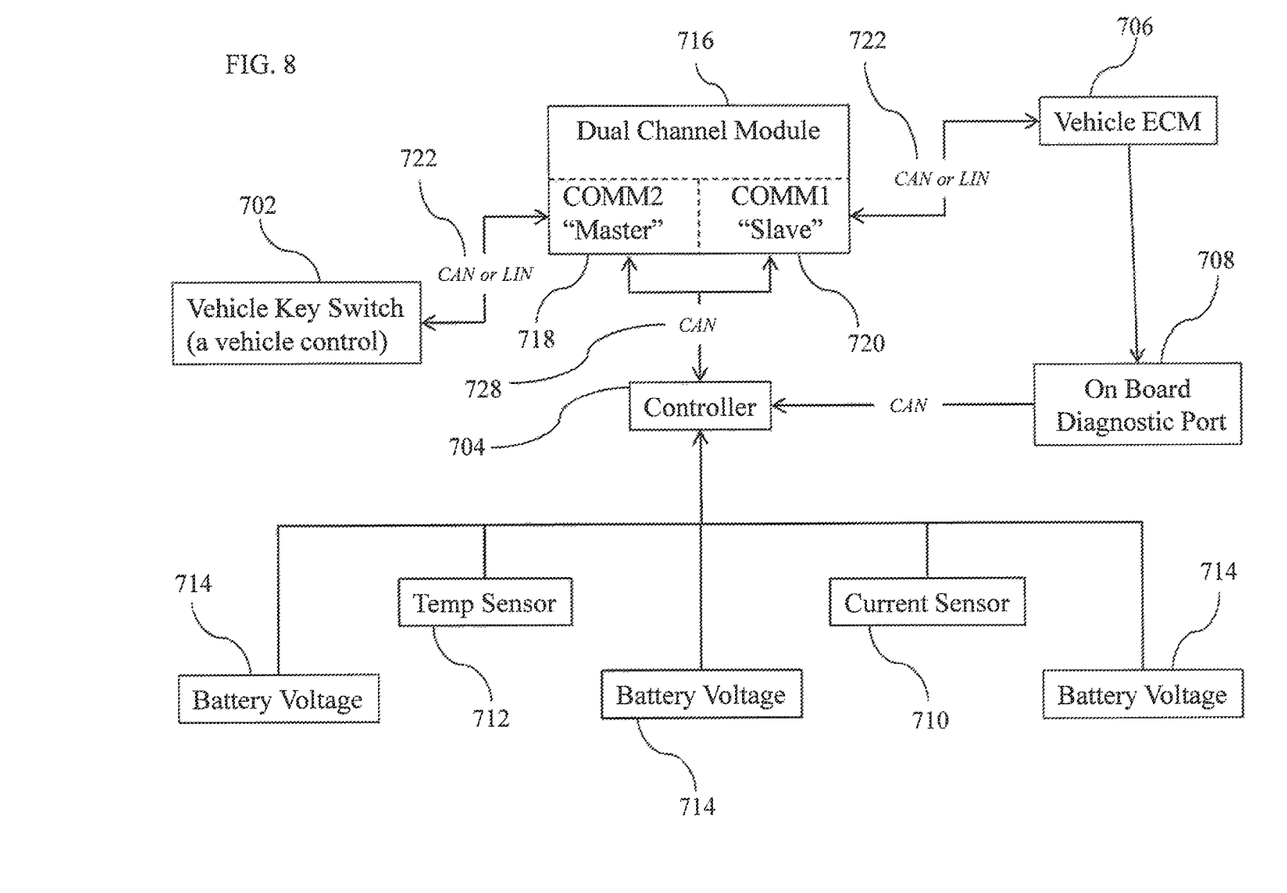
FIG. 8 is a flow chart schematically showing the communication between the vehicle key switch (a vehicle control), controller, vehicle ECM, on board diagnostic port, dual channel module and various vehicle sensors in the present invention.

Another alternate embodiment is shown in FIG. 8, which is a schematic diagram showing the flow of electrical communication between a vehicle control, in this case vehicle key switch 702, dual channel module 716, vehicle ECM 706, controller 704, on board diagnostic port 708 and various sensors in the vehicle such as battery voltage 714, temperature sensor 712 and current sensor 710.

Figure 7:
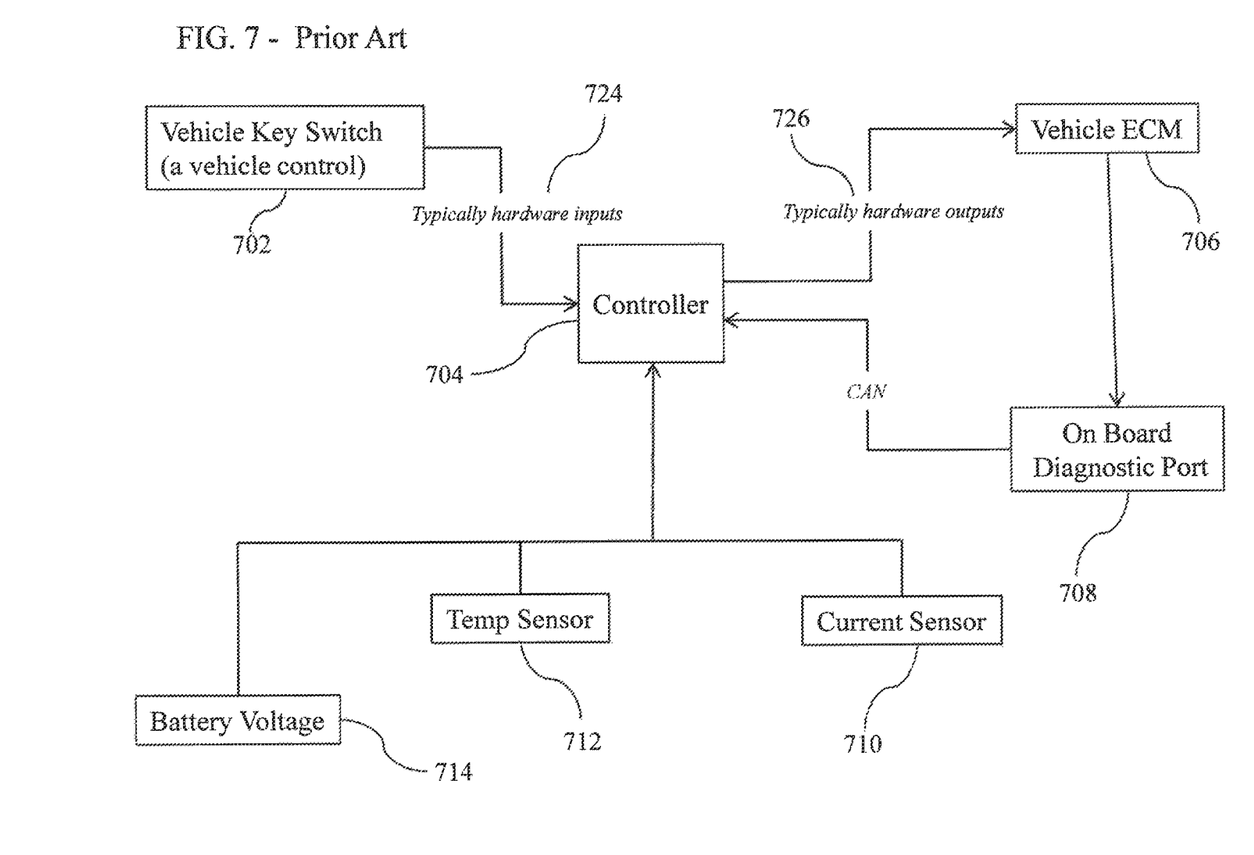
FIG. 7 is a flow chart schematically showing the typical communication between the vehicle key switch, controller, vehicle ECM, on board diagnostic port and various vehicle sensors in the prior art.

FIG. 7 shows the typical prior art set-up, which does not include a dual channel module 716 and typically requires hardware inputs 724 instead to connect controller 704 to the vehicle controls, in this example the vehicle key switch 702, and hardware outputs 726 to connect controller 704 to vehicle ECM 706 instead of CAN or LIN connections 722.

Dual channel module 716 contains a master portion 718 and a slave portion 720 that are both in communication with the controller 704 via CAN connections 728. The master portion 718 is in CAN or LIN 722 communication with the vehicle controls, in this instance the vehicle key switch 702, and the slave portion 720 is in CAN or LIN communication 722 with the vehicle ECM 706. The dual channel module 716 impersonates the vehicle controls, in this case the vehicle key switch 702, when the slave portion 720 communicates with the vehicle ECM and the master portion 718 impersonates the vehicle ECM 706 when it communicates with the vehicle controls, in this case the vehicle key switch 702. In this way, the present invention operates smoothly with the proprietary software of the vehicle controls and vehicle ECM without the need for hardware modifications.

Messages from vehicle controls, in this case the vehicle key switch 702, that would normally be sent to vehicle ECM 706, are intercepted by the master portion 718 of dual channel module 716 which then re-creates the message and forwards it to the controller 704. The controller 704 determines if the feedback message received from the vehicle controls, in this instance the vehicle key switch 702, is consistent with vehicle running state desired and may alter the message accordingly before sending to the slave portion 720 of the dual channel module 716. The slave portion 720 re-creates and forwards the desired message regarding the vehicle key switch state directly to the vehicle ECM 706 so that the vehicle ECM 706 provides the desired command to the engine and ancillary features.

For example, if there is no key in the ignition but the controller 704 has received data from the temperature sensor 712 that the temperature is too low and the engine should be running to increase cab temperature, then the controller 704 may send a key-in-ignition message to the slave portion 720 to be forwarded to the vehicle ECM 706 so that the vehicle ECM 706 turns on the engine or keeps it running. The no-key-in-ignition message being sent by the vehicle key switch 702 is intercepted by the master portion 718 of the dual channel module 716, re-created and forwarded to the controller 704. The controller 704 overrides the no-key-in-run message due to the low temperature message received from temperature sensor 712 and replaces it with a key-in-ignition message to the slave portion 720 of the dual channel module 716. The slave portion 720 forwards the key-in-ignition message directly to the vehicle ECM 706 which responds accordingly by commanding that the engine and/or relevant ancillary features be turned on to increase the temperature in the vehicle.

The slave portion 720 intercepts commands from the vehicle ECM that would normally be sent to the vehicle controls, in this case the vehicle key switch 702, to control the ignition position, such as accessory, run or start, and instead re-creates the command and forwards the command to the controller 704 through CAN communication 728. The controller 704 uses information from various sensors such as the battery voltage sensor 714, temperature sensor 712 and current sensor 710 and on board diagnostic port 708 to determine the desired ignition position. The controller 704 then sends the engine on/off command to the master portion 718 of dual channel module 716 to then re-create the command and forward the command to the vehicle key switch 702.

Under normal vehicle operating conditions, the messages between the vehicle controls and vehicle ECM 706 are merely intercepted, re-created unaltered and relayed to each other through the dual channel module 716 and the controller 704.

Under system control operation, messages from the vehicle controls or the vehicle ECM may be received, removed from transmission and replaced with a message that communicates the desired engine operating condition or ancillary system operating condition by the controller 704. For example, if the controller 704 determines the engine should be shut down because the vehicle is in idle while the key ignition is in "run", the controller 704 will remove a "run" message sent from the vehicle key switch 702 and forwarded by the master portion 718 of the dual channel module 716. It will replace the "run" message with an "off" message and send that to the slave portion 720 of the dual channel module 716, which then forwards the "off" message to the vehicle ECM 706. Vehicle ECM 706 will then turn the engine off.

The controller 704 also intercepts feedback from on board diagnostic port 708 and may alter and replace the feedback message to send the desired message to the vehicle ECM 706 that would continue running the desired operating condition. The controller 704 would replace an undesirable feedback message from the on board diagnostic port 708 and send the replacement message to the slave portion 720 of the dual channel module 716 to then be forwarded to the vehicle ECM 706.

The controller 704 uses the same logic to determine shut down and start up conditions as previously mentioned but interfaces with the vehicle controls and the vehicle ECM 706 through the dual channel module 716 instead. The advantages of routing messages through dual channel module 716 include removing the need for hardware inputs 724 and hardware outputs 726 as seen in FIG. 7 and being able to electrically communicate all messages through CAN or LIN communication 722. The dual channel module 716 allows the controller 704 to seamlessly interface with the proprietary software of the vehicle ECM 706 without directly altering or hacking the proprietary software, which could affect the owner's warranty or ability to receive servicing from dealership technicians.

Therefore, control of the vehicle can be achieved without the need to reprogram any original equipment found in the vehicle but rather by inserting dual channel modules which relay messages directly to the vehicle ECM and receive and send messages to and from a vehicle control and controller.

I claim:

1. A method of controlling a vehicle's engine idle while the vehicle is at rest, comprising the steps of:
   a) placing the vehicle transmission to a position selected from among park or neutral;
   b) shut down engine by turning key to the off position and removing the key from the ignition;
   c) driver exits the vehicle;
   d) an on board controller configured for monitoring a vehicles operating parameters from the vehicle's electronic control module (ECM) through the CAN BUS communications port the onboard controller is configured to compare preselected operating parameters to preselected startup conditions;
   e) providing at least one dual channel module which has a master portion in direct electrical communication with a vehicle control and a slave portion in direct communication with the ECM wherein in a normal operating mode the slave portion recreates the normal vehicle control signal received by the master portion and communicates this directly to the ECM, the at least one dual channel module is for the vehicle key switch;
   f) wherein the dual channel module also in communication with the on board controller for receiving instructions to modify the signals sent by the slave portion directly to the ECM, and if required by the master portion to receive and return signals directly to the vehicle control in the event preselected operating condition parameters are met to startup or shut down;
   g) in the event preselected startup conditions are met the onboard controller is adapted to communicate with the dual channel module which intercepts key position signals from the vehicle key switch and the slave portion sends the key run position signal directly to the ECM directly thereby enabling vehicle functions operable as if the key is in run position and the master portion will receive and return signals directly to the vehicle control as required to ensure shut down can occur even if the physical key position remains unchanged;
   h) the dual channel module is configured to automatically start up the engine and the engine idles with the vehicle at rest.

2. The method claimed in claim 1 further including the steps of;
   i) the onboard controller monitoring a vehicles operating parameters through the CAN BUS communications port with and comparing preselected operating parameters to preselected shutdown conditions;
   j) in the event shutdown conditions are met the onboard controller is configured to communicate with the dual channel module wherein the slave portion will send signals directly to the ECM to shut down the engine and the master portion will receive and return signals to the vehicle control as required to ensure shut down can occur even if the physical key position remains unchanged;

k) return to step d), thereby continuously and automatically starting and stopping the engine depending upon the condition of the preselected operating parameters.

3. The method claimed in claim 2 further including the step a') after a) as follows:
   a') providing a controller interface communicating with the onboard controller and displaying in real time the status of the vehicle to the operator on a display screen.

4. A method of controlling a vehicle's engine idle while the vehicle is at rest, comprising the steps of:
   a) placing the vehicle transmission to a position selected from among park or neutral;
   b) shut down engine by turning key to the off position and removing the key from the ignition and placing the vehicle into an anti-theft mode such that if the vehicle transmission is disengaged from park or neutral the engine will shut down and not restart until the anti-theft mode has been deactivated with a function on the controller interface;
   c) driver exits the vehicle;
   d) an on board controller configured for monitoring a vehicles operating parameters from the vehicle's electronic control module (ECM) through the CAN BUS communications port the onboard controller is configured to compare preselected operating parameters to preselected startup conditions;
   e) providing at least one dual channel module which has a master portion in direct electrical communication with a vehicle control and a slave portion in direct communication with the ECM wherein in a normal operating mode the slave portion recreates the normal vehicle control signal received by the master portion and communicates this directly to the ECM, the at least one dual channel module is for the vehicle key switch;
   f) wherein the dual channel module also in communication with the on board controller for receiving instructions to modify the signals sent by the slave portion directly to the ECM, and if required by the master portion to receive and return signals directly to the vehicle control in the event preselected operating condition parameters are met to startup or shut down;
   g) in the event preselected startup conditions are met the onboard controller is adapted to communicate with the dual channel module which intercepts key position signals from the vehicle key switch and the slave portion sends the key run position signal directly to the ECM directly thereby enabling vehicle functions operable as if the key is in run position and the master portion will receive and return signals directly to the vehicle control as required to ensure shut down can occur even if the physical key position remains unchanged;
   h) The dual channel module is configured to automatically start up the engine and the engine idles with the vehicle at rest.

5. The method claimed in claim 3 further wherein step f) is replaced with f') as follows:
   f') the onboard controller warns the operator of an impending startup and the onboard controller automatically starts up the engine and the engine idles with the vehicle at rest, thereby continuously and automatically starting and stopping the engine depending upon the condition of the preselected operating parameters.

6. The method claimed in claim 1 wherein the vehicles operating parameters are received from the vehicle CAN BUS interface which receives data from existing sensors within the vehicle.

7. The method claimed in claim 1 wherein the onboard controller is a programmable logic controller communicating with the CAN BUS interface.

8. The method claimed in claim 7 wherein the programmable logic controller intercepts signals from the on board computer regarding the ignition key status and communicates signals to the vehicles on board computer selectively activating preselected key positions thereby enabling preselected vehicle functions as if the vehicle was in that key position.

9. The method claimed in claim 1 wherein step further including the step g) as follows;
   g) in the event shutdown conditions are met the onboard controller automatically shuts down engine and the onboard controller intercepts key position signals from the ignition and sends a key accessory position signal to the on board computer thereby enabling vehicle functions operable as if the key is in the accessory position.

10. The method claimed in claim 1 further including the step of providing a controller interface communicating with the onboard controller and displaying in real time the status of the vehicle to the operator.

11. The method claimed in claim 10 wherein the controller interface is a high resolution screen communicating with the onboard controller.

12. The method claimed in claim 10 wherein the controller interface displays to the operator whether or not the vehicle engine is on.

13. The method claimed in claim 1 wherein the onboard controller monitoring vehicle transmission position.

14. The method claimed in claim 1 wherein the onboard controller monitoring vehicle key position.

15. The method claimed in claim 1 wherein the onboard controller monitoring vehicle battery voltage.

16. The method claimed in claim 1 wherein the onboard controller monitoring vehicle hood position.

17. A method of controlling a vehicle's engine idle while the vehicle is at rest, comprising the steps of:
   a) the vehicle gear shift is placed in a position selected from among park or neutral and the key is left in the ignition in the run position;
   b) monitoring a vehicles operating parameters with a onboard controller and comparing preselected operating parameters to preselected shutdown conditions wherein the onboard controller monitors the driver's seatbelt engagement status which is one of the preselected operating parameters;
   c) if shutdown conditions are met the onboard controller intercepts key position signals from the ignition and sends the key off position signal to the vehicles on board computer thereby shutting down the engine;
   d) monitoring a vehicles operating para meters with an onboard controller and comparing preselected operating parameters to preselected startup conditions;
   e) in the event preselected startup conditions are met the onboard controller intercepts key position signals from the ignition and send engine startup signal to the on hoard computer thereby starting up the engine and enabling vehicle functions with the engine idling and the vehicle at rest;
   f) return to step b.

18. The method claimed in claim 5 further including the step b') after b) as follows:
   b') providing a controller interface communicating with the onboard controller and displaying in real time the status of the vehicle to the operator on a display screen.

19. The method claimed in claim 6 further including the step g) as follows:
- g) if shutdown conditions are met, onboard controller initiates a preselected countdown time to engine shutdown and displays the countdown on the display screen, once the countdown is complete the onboard controller intercepts key position signals from the ignition and sends the key off position signal to the vehicles on hoard computer thereby shutting down the engine.

20. The method claimed in claim 6 further including the step g) and h) as follows:
- g) if shutdown conditions are met, onboard controller initiates a preselected countdown time to engine shutdown and displays the countdown on the display screen, operator may cancel the shutdown with a controller interface function;
- h) once the countdown is complete the onboard controller intercepts key position signals from the ignition and sends the key off position signal to the vehicles on board computer thereby shutting down the engine.

* * * * *